United States Patent Office 2,783,278
Patented Feb. 26, 1957

2,783,278

PURIFICATION OF O-NITRODIPHENYLAMINE

Jack Horstmann Thelin, Somerville, Herman Cherlow, North Plainfield, and Frederic Houghton Megson, Bound Brook, N. J., assignors to American Cyanamid Company, New York, N. Y., a corporation of Maine No Drawing. Application April 20, 1954,
Serial No. 424,494

6 Claims. (Cl. 260—576)

This invention relates to an improved process of purifying o-nitrodiphenylamine.

Ortho-nitrodiphenylamine is an important intermediate in the preparation of certain dyestuffs. It is generally prepared by the reaction of aniline with o-nitrochlorobenzene. During the course of the reaction, a fraction of the reaction mixture reacts further to produce phenazine. The crude reaction mixture is ordinarily distilled to separate out the o-nitrodiphenylamine. In this manner, any unreacted aniline is recovered, and a fraction of pure o-nitrodiphenylamine, together with a fraction comprising a mixture of o-nitrodiphenylamine and phenazine, is obtained. As much as 20% of the total amount of o-nitrodiphenylamine that can be recovered is thereby contaminated with phenazine.

To recover the o-nitrodiphenylamine by redistillation is inefficient, for the boiling points of the materials are too close for separation by simple distillation. Furthermore, the boiling points of the compounds are high which necessitates a high vacuum in order to prevent decomposition. The latter precludes the use of a fractionating column. This simple distillation method will recover only 30% to 40% of the o-nitrodiphenylamine present in the contaminated fraction.

In accordance with the present invention, we have discovered that a mixture of o-nitrodiphenylamine and phenazine, as obtained in the above-described manner, for example, may be contacted with an aqueous acid so as to form a water-soluble salt of the phenazine. The o-nitrodiphenylamine is practically insoluble in the acid solution so it may be easily recovered by filtration, washing and drying. The phenazine salt dissolves in the aqueous acid and may be recovered from the filtrate if desired by treatment with caustic. The selective extraction of the phenazine from the phenazine-o-nitrodiphenylamine mixture permits the recovery of pure o-nitrodiphenylamine.

It is a surprising feature of the present invention that the phenazine, instead of the o-nitrodiphenylamine, forms a salt with the dilute acid. Since both of these compounds are basic, it would not be expected that there would be such differences in their solubilities in acid solution so as to permit them to be so completely separated in this manner.

It is also a surprising feature of the present invention that the phenazine can be extracted while the o-nitrodiphenylamine remains a solid. This could not be predicted.

In carrying out the present invention, a crude intermediate fraction containing o-nitrodiphenylamine and phenazine is flaked or pulverized and is slurried in the aqueous acid. The mixture is slurried until no further phenazine dissolves in the acid solution and the o-nitrodiphenylamine is thereafter isolated by filtration, washing and drying.

The temperature at which the extraction is carried out is not critical. Obviously, the efficiency of the process is favored if the extraction is carried out at elevated temperatures. If the extraction is done cold, it may be necessary to re-extract several times. In general, temperatures ranging from about 25° C. to 80° C. have been used satisfactorily.

The choice of acid used for the extraction is not unduly critical. The acid must, of course, be water-soluble so as to insure contact between the acid and the solid from which the phenazine is to be extracted. The acid must also form a water-soluble salt of the phenazine. In general, this permits the use of a wide range of common acids, both mineral acids and low molecular weight organic acids. Among the suitable acids, there may be mentioned sulfuric, hydrochloric, phosphoric, hydrobromic, acetic, chloroacetic, trichloroacetic, formic, propionic, etc.

The strength of the aqueous acid used is a factor of some importance in the successful operation of the present invention. The lower limit of the acid concentration which is effective in extracting the phenazine is that at which salt formation of the phenazine takes place, that is to say, about that of a normal solution of the acid in water. The upper limit of acid concentration is fixed by the strength in which the o-nitrodiphenylamine is no longer insoluble. Obviously, this will vary with different acids, the weaker acids such as acetic being usable in as high a concentration as 70–75%. With sulfuric acid, however, charring occurs above about 50% acid strength. Therefore, it is preferred to define the limits of the acid concentration as being of sufficient strength so as to form a phenazine salt but insufficient to cause dehydration and charring of the organic material. Or, the upper concentration of the acid may be defined as being below that at which salt formation of both phenazine and o-nitrodiphenylamine occurs or dehydration or charring takes place.

The choice of the acid to be used and the concentration and temperature at which it is used depends on (1) the amount of phenazine which must be removed, and (2) the purity of the o-nitrodiphenylamine to be produced. If the amount of impurity is small or the desired purity is not so high, weaker acids, lower concentrations, and lower temperatures can be used. Conversely, to get purer o-nitrodiphenylamine or to remove large amounts of phenazine or both, stronger acids and hot extractions may be used. Recycling can also effect such separation, but economic considerations are all in favor of using stronger acid and heat, since it is possible in many cases to obtain good o-nitrodiphenylamine in only one extraction by this method.

It is an advantage of the present invention that, in contrast to redistilling the impure fraction, the improved process permits the recovery of the o-nitrodiphenylamine directly and quantitatively in a usable purity.

It is a further advantage of the present invention that the by-product phenazine can be recovered in good purity by the basification of the extract with caustic, for example, and can thus also be used for the preparation of other chemicals.

The invention will be described in greater detail in conjunction with the following examples, in which parts are by weight unless otherwise indicated.

Example 1

Five parts of the flaked fraction from the distillation of a crude o-nitrodiphenylamine reaction mixture, which has a setting point appreciably lower than pure o-nitrodiphenylamine due to the presence of phenazine as an impurity, are intimately mixed with 20 parts of $N/1 H_2SO_4$. The mixutre is heated to 80° C. and stirred for a short time at this temperature. The mixture is then cooled to 30° C. and filtered. The cake is washed on the filter four times with water, once with a sodium carbonate solution and four more times with water. The washed cake is then dried in the oven. The setting point of the treated material is equivalent to that of pure o-nitrodiphenylamine.

Example 2

Five parts of the flaked fraction containing phenazine as an impurity from the distillation of a crude o-nitrodiphenylamine reaction mixture are stirred with 30 parts of concentrated hydrochloric acid for a short time at room temperature. The mixture is filtered and the cake is given four water washes, one sodium carbonate wash, followed by four more water washes. The washed cake is dried in the oven. The setting point of the treated material is equivalent to that of pure o-nitrodiphenylamine.

Example 3

Seventeen parts of the flaked fraction containing phenazine as an impurity from the distillation of a crude o-nitrodiphenylamine reaction mixture are extracted four times with 20% phosphoric acid at room temperature, each extraction using 20 parts of phosphoric acid. Each time the mixture is stirred for a short time at room temperature and is then filtered. After the last extraction, the cake is washed four times with water, once with a sodium carbonate solution, followed by four more washings with water. The washed cake is dried in the oven. The setting point of the treated material is equivalent to that of pure o-nitrodiphenylamine.

Example 4

To 18 parts of the flaked fraction containing phenazine as an impurity from the distillation of an o-nitrodiphenylamine reaction mixture are added 50 parts of 70% acetic acid. The mixture is stirred for a short time at room temperature and then filtered. The cake is washed four times with water, followed by a sodium carbonate wash, and by four more washings with water. The washed cake is dried in the oven. The setting point of the treated material is equivalent to that of pure o-nitrodiphenylamine.

We claim:

1. The method of purifying o-nitrodiphenylamine which comprises contacting, at a temperature not in excess of 80° C., a solid mixture comprising o-nitrodiphenylamine contaminated with phenazine with an aqueous solution of an acid selected from the group consisting of sulfuric, hydrochloric, phosphoric, hydrobromic, acetic, chloroacetic, trichloroacetic, formic, and propionic acids, the temperature and acid strength being such that a water-soluble salt of phenazine with said acid is formed, and that a water-soluble salt of o-nitrodiphenylamine is not formed, and separating the purified solid o-nitrodiphenylamine from the solution containing the salt of phenazine.

2. The method according to claim 1 in which the extraction is carried out at a temperature above about 50° C.

3. The method according to claim 1 in which the aqueous acid is sulfuric acid of less than 50% strength.

4. The method according to claim 1 in which the aqueous acid is hydrochloric acid.

5. The method according to claim 1 in which the aqueous acid is phosphoric acid.

6. The method according to claim 1 in which the aqueous acid is acetic acid.

No references cited.